United States Patent
Futamura

[19]

[11] Patent Number: 6,023,609
[45] Date of Patent: Feb. 8, 2000

[54] DEVICE FOR SEPARATING TRANSMITTING WAVES AND RECEIVING WAVES AND A RADIO COMMUNICATION EQUIPMENT PROVIDED WITH THE DEVICE

[75] Inventor: Kazuhiro Futamura, Kanagawa, Japan

[73] Assignee: Fujitsu Limited, Kanagawa, Japan

[21] Appl. No.: 08/972,658

[22] Filed: Nov. 18, 1997

[30] Foreign Application Priority Data

May 12, 1997 [JP] Japan ..................................... 9-120509

[51] Int. Cl.⁷ ..................................................... H04B 1/46
[52] U.S. Cl. .............................. 455/82; 455/83; 455/266; 455/340; 333/129; 333/132
[58] Field of Search .................... 455/78, 82, 83, 455/84, 266, 340; 333/126, 129, 132, 133, 134, 135

[56] References Cited

U.S. PATENT DOCUMENTS

| 5,323,127 | 6/1994 | Komazaki et al. | 333/129 |
| 5,442,812 | 8/1995 | Ishizaki et al. | 455/82 |
| 5,475,871 | 12/1995 | Shalev et al. | 455/266 |
| 5,541,560 | 7/1996 | Turunen et al. | 333/134 |
| 5,554,960 | 9/1996 | Ohnuki et al. | 333/132 |
| 5,659,886 | 8/1997 | Taira et al. | 445/82 |
| 5,923,229 | 7/1999 | Simons | 333/135 |

*Primary Examiner*—Dwayne D. Bost
*Assistant Examiner*—Quochien B. Vuong
*Attorney, Agent, or Firm*—Helfgott & Karas, PC

[57] ABSTRACT

This separating device is provided with a transmitting filter and a receiving filter. Each of the transmitting and receiving filters comprises a variable capacity diode and a resonant element, and compose a band elimination filter. Each of the elimination bands of the transmitting and receiving filters can be adjusted by changing the capacity value of each variable capacity diode. The elimination band of the transmitting filter is adjusted so as to coincide with the receiving frequency of the communication channel currently used. The elimination band of the receiving filter is adjusted so as to coincide with the transmitting frequency of the communication channel currently used.

12 Claims, 13 Drawing Sheets

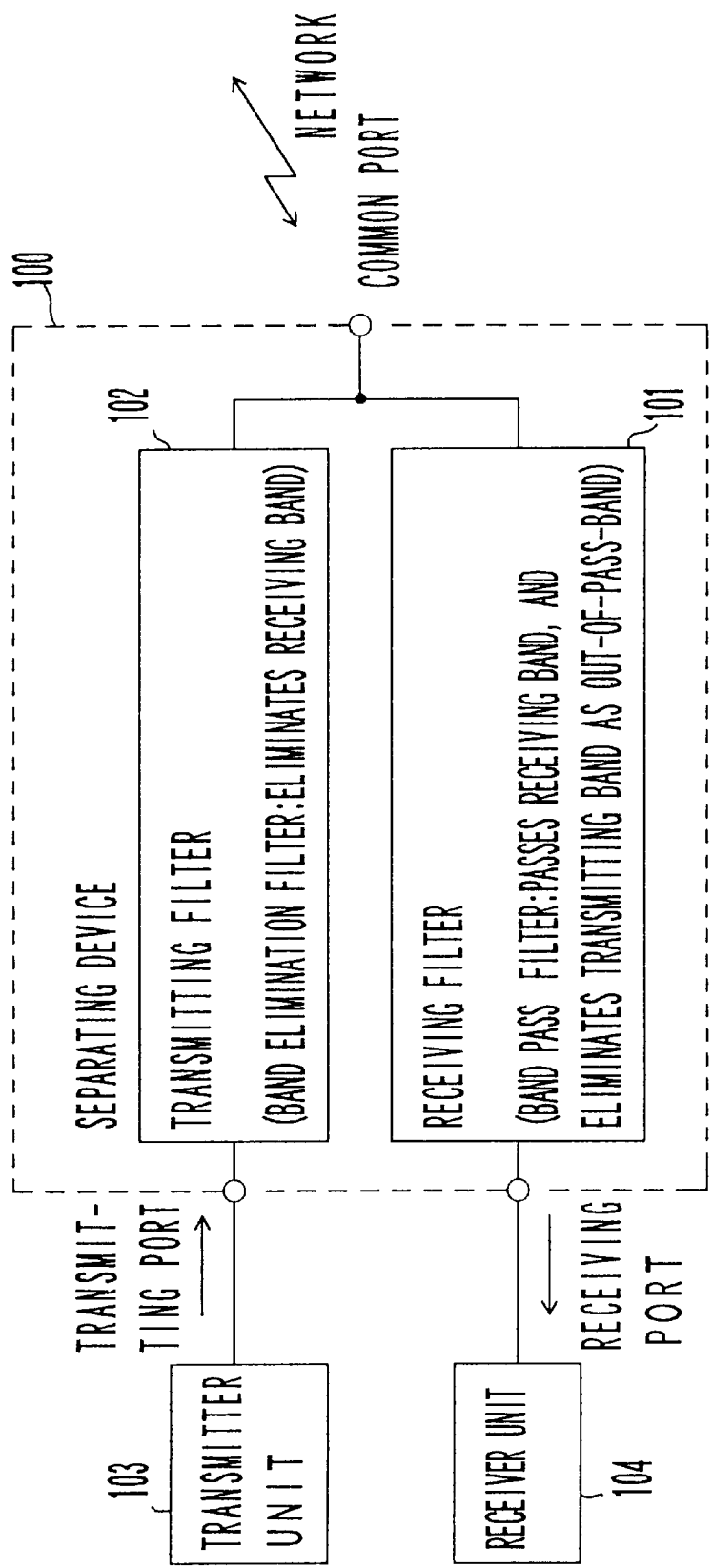
F I G. 1

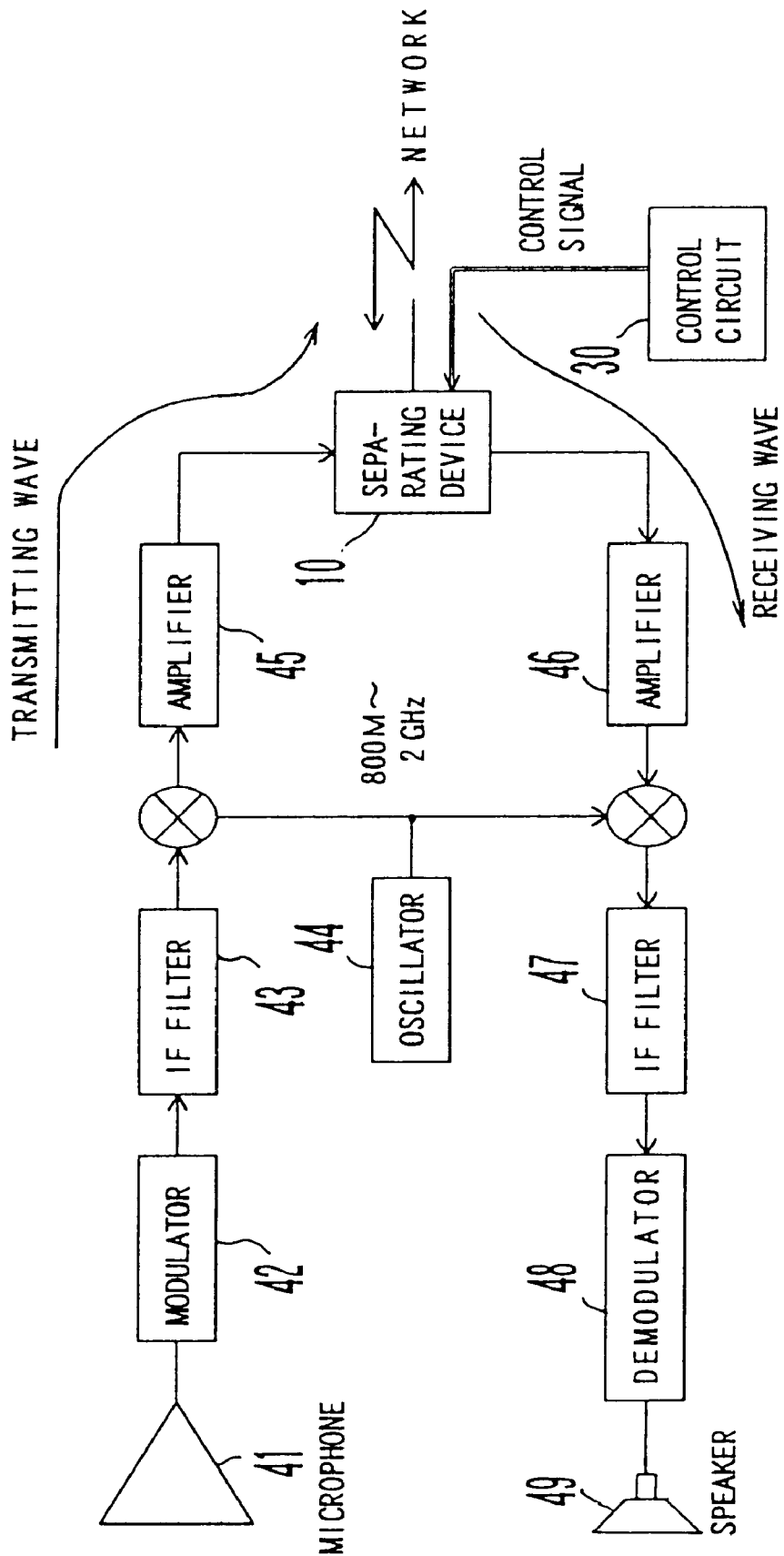
F I G. 8

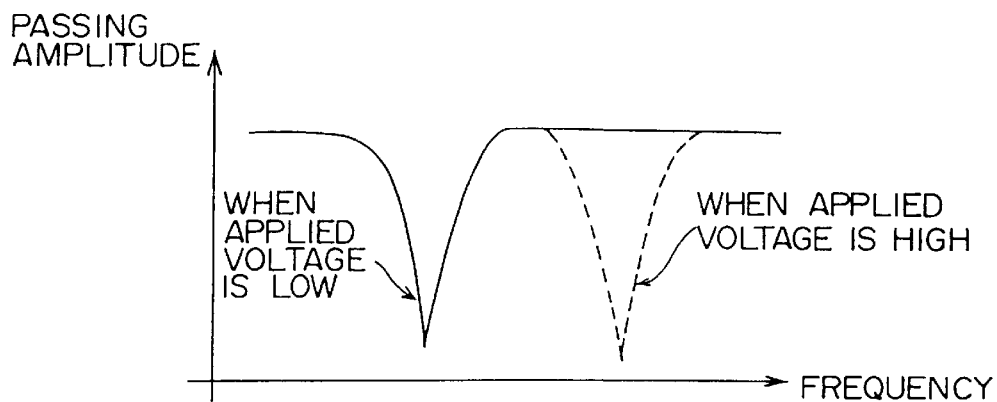
FIG. 10A
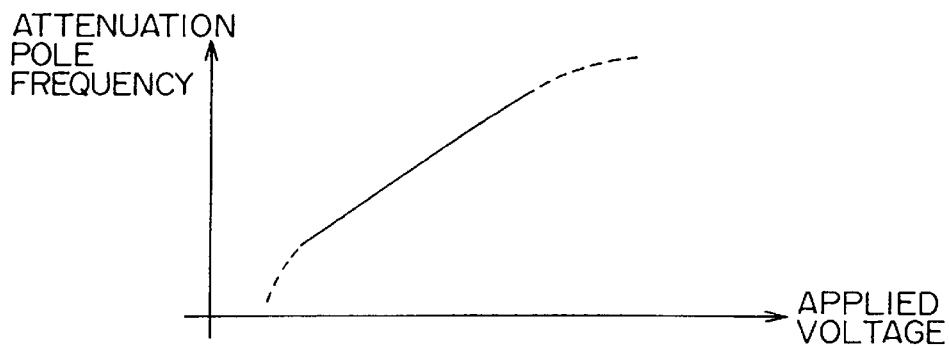
FIG. 10B
| CHANNEL | TRANSMITTING FREQUENCY | APPLIED VOLTAGE FOR RECEIVING FILTER | RECEIVING FREQUENCY | APPLIED VOLTAGE FOR TRANSMITTING FILTER |
|---|---|---|---|---|
| 1 | 800(MHz) | 0.500(V) | 850(MHz) | 1.750(V) |
| 2 | ⋮ | ⋮ | ⋮ | ⋮ |
| 3 | ⋮ | ⋮ | ⋮ | ⋮ |
| ⋮ | ⋮ | ⋮ | ⋮ | ⋮ |
| 1000 | 820 | 1.000 | 870 | 2.250 |
| ⋮ | ⋮ | ⋮ | ⋮ | ⋮ |
| 2000 | 840 | 1.500 | 890 | 2.750 |
FIG. 10C

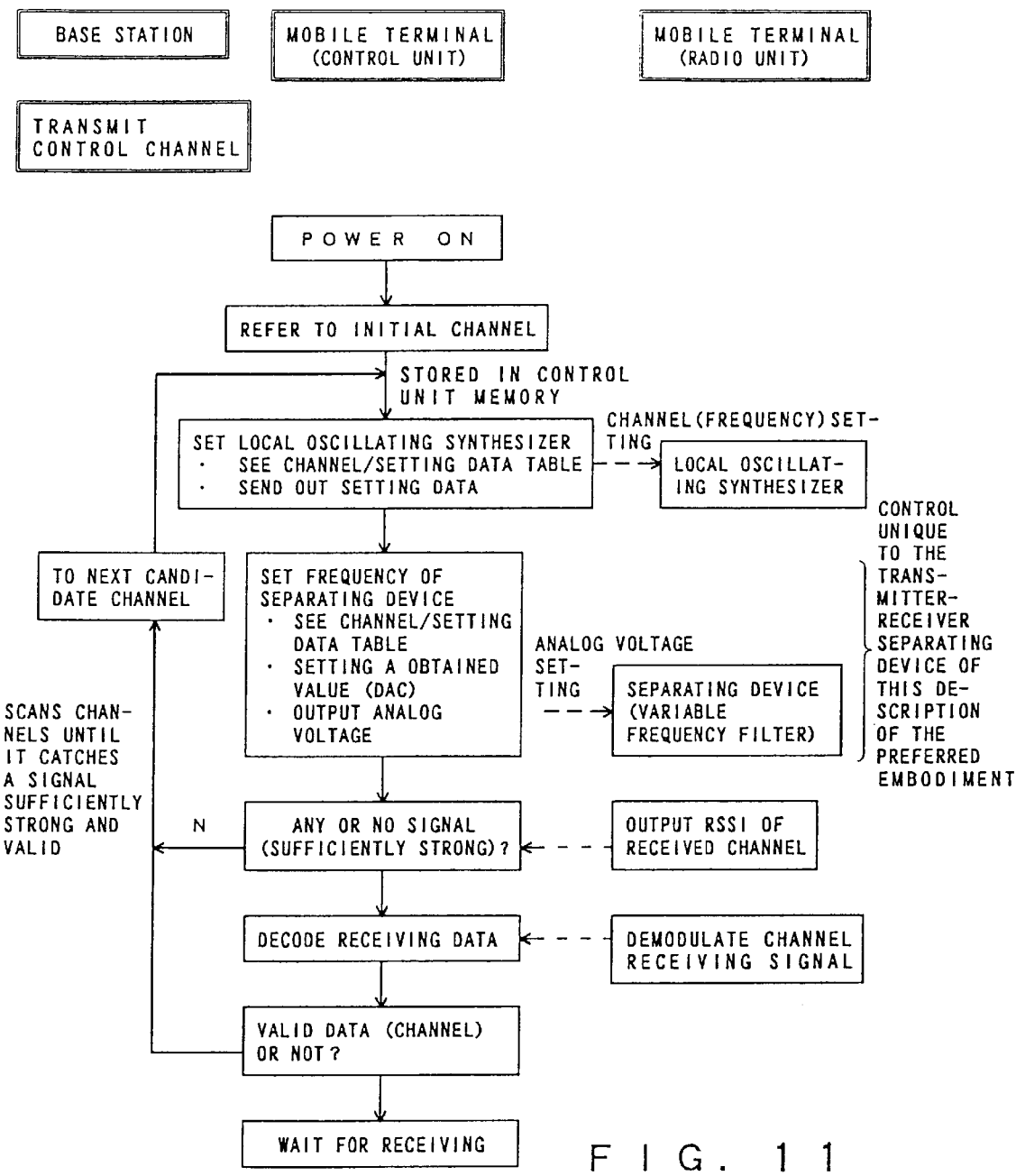
F I G. 1 1

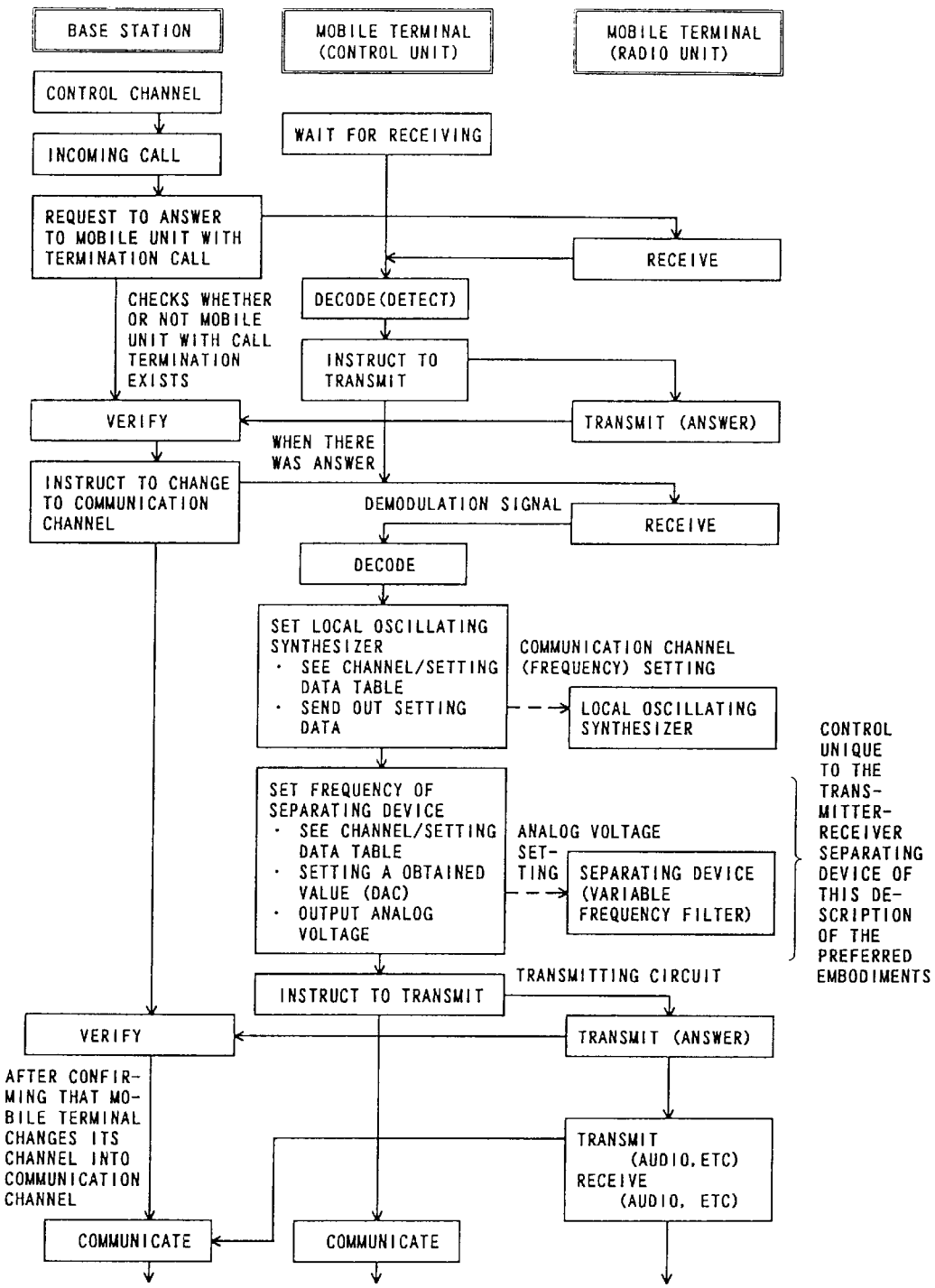
F I G. 1 2

DEVICE FOR SEPARATING TRANSMITTING WAVES AND RECEIVING WAVES AND A RADIO COMMUNICATION EQUIPMENT PROVIDED WITH THE DEVICE

BACKGROUND OF THE INVENTION

1. Field of the Invention

The present invention relates to a device for separating transmitting waves and receiving waves, especially to a device provided in radio communication equipment, the equipment being used in a system in which a transmitting frequency band and a receiving frequency band are different from each other and the equipment transmitting and receiving signals simultaneously, for separating transmitting signals and receiving signals.

2. Description of the Related Art

These days the number of people carrying mobile communication terminal equipment such as cellular phones and portable data processing devices is increasing. The mobile communication terminal equipment usually performs communication with other terminal equipment by establishing a channel on a network in a specified radio frequency band, and transmitting and receiving radio signals over the channel. Therefore, such mobile communication terminal equipment needs a function for separating transmitting and receiving waves.

FIG. 1 explains the separating of transmitting and receiving waves. Here, for example, the separating of transmitting and receiving waves in mobile communication terminal equipment is explained. The mobile communication terminal equipment shown in FIG. 1 transmits signals generated in a transmitter unit 103 to a network through a common port using a transmitting wave. At the same time it obtains receiving signals out of a receiving wave received from the network through the common port and processes them in a receiver unit 104. Here, as shown in FIGS. 2A and 2B, a frequency band for a transmitting wave (transmitting band) and that for a receiving wave (receiving band) are different from each other.

A separating device 100 is provided with a receiving filter 101 and a transmitting filter 102. As shown in FIG. 2A, the receiving filter 101 is a band pass filter which passes only frequency elements for the receiving band and attenuates those for other than the receiving band. Therefore, when waves received from the network passes through the receiving filter 101, frequency elements other than for the receiving band are substantially eliminated and only signals of the receiving band remain. Then, the receiver unit 104 obtains transmission signals from signals which have passed through the receiving filter 101 and reproduces them.

On the other hand, when transmitting signals generated in the transmitter unit 103 are sent out to the network over a transmitting wave in such a common port configuration as shown in FIG. 1, part of the transmitting wave is input to the receiving filter 101. This transmitting wave also contains a frequency element for the receiving band (this is usually contained as noise). Because, generally speaking, the transmitting radio power is far greater than the receiving radio power, the frequency element for the receiving band is not eliminated by the receiving filter 101 and is input into the receiver unit 104 if it is contained in a transmitting wave. Accordingly, there is a fear that it becomes difficult or impossible to reproduce the signals transmitted over a receiving wave or the receiver unit 104 may be saturated. For this reason the separating device 100 is provided with the transmitting filter 102, which is a band elimination filter, for sufficiently attenuating the frequency element for the receiving band contained in a transmitting wave. In other words, by introducing the transmitting filter 102, the frequency element for the receiving band is eliminated from the transmitting wave.

Incidentally, in a mobile communication system usually a great many (several hundred to several thousand) communication channels are provided within a communication band allocated to each common carrier. When a mobile communication terminal communicates with another terminal, a channel in an unused state (idle channel) out of these many communication channels is allocated to a connection. Thus, each mobile communication terminal can receive signals of all frequencies within the receiving band and transmit signals of any frequency within the transmitting band. Namely, as shown in FIG. 2A, receiving filter 101 passes the entire receiving band, and as shown in FIG. 2B, transmitting filter 102 eliminates the entire receiving band. In other words, the pass band width of receiving filter 101 is broader than the entire receiving band, and the elimination band width (attenuation band width) of transmitting filter 102 is broader than the entire receiving band.

The separating device 100 can also be provided with a band pass filter for passing transmitting bands only in place of the elimination filter as the transmitting filter 102. However, the attenuation volume of signals in a transmitting band is smaller if a band elimination filter which eliminates the receiving band is used instead of a band pass filter which passes the transmitting band. For this reason, as a transmitting filter provided in a separating device, especially in the case that it is used in a radio communication terminal where compactness is required, a band elimination filter which eliminates receiving band is mainly adopted.

Generally, a communication band width in a mobile communication system is relatively broad, such as several MHz to several tens of MHz. For this reason, a broad elimination band which covers the entire receiving band and a broad pass band which covers the entire receiving band are required for a transmitting filter and a receiving filter comprising a separating device. To separate a transmitting wave from a receiving wave, each of transmitting and receiving filters must provide a large amount of attenuation (in the case of a resonant type filter, a high resonant frequency Q).

However, broadening a band width and increasing an attenuation volume conflict with each other. For this reason, to make a filter provided with both broad band and large attenuation, several filters with different frequency characteristics (in the case of resonant type filters, with different resonant frequencies) have been combined. Many transmitting and receiving filters of the existing separating device are composed of three to seven stages of resonant type filters.

In this way, when several resonant filters are combined, it becomes difficult to miniaturize a separating device. Naturally, its weight also increases. Furthermore, its material and processing costs increase, because the number of components is larger.

SUMMARY OF THE INVENTION

The purpose of this invention is to reduce the weight of and to miniaturize a device for separating transmitting waves and receiving waves with a good filter function over a broad band.

A separating device of the present invention comprises a transmitting filter and a receiving filter to separate a transmitting wave and a receiving wave in a communication equipment. Both of the transmitting filter and the receiving filter are band elimination filters. A center frequency of the elimination band of the transmitting filter is adjusted based on the frequency of the receiving wave. A center frequency of the elimination band of the receiving filter is adjusted based on the transmitting wave. Each width of the elimination band of the transmitting and receiving filters is narrower than that of a receiving band and transmitting band.

A radio communication apparatus of the present invention transmits and receives signals through one of several communication channels provided within a predetermined radio band, and comprises the following; separating device, detecting unit and control unit. The separating device includes a transmitting filter and a receiving filter. Both of the transmitting filter and the receiving filter are band elimination filers. A center frequency of the elimination band of the transmitting filter is adjustable externally. A center frequency of the elimination band of the receiving filter is adjustable externally. The separating device separates a transmitting wave and a receiving wave. The detecting unit detects a communication channel for transmitting and receiving radio signals. The control unit matches the center frequency of the elimination band of the transmitting filter with the receiving frequency of the communication channel detected by the detecting unit and matches the center frequency of the elimination band of the receiving filter with the transmitting frequency of the communication channel detected by the detecting unit.

BRIEF DESCRIPTION OF THE DRAWINGS

FIG. 1 shows the concept of separation of a transmitting wave and a receiving wave.

FIG. 8 is a block diagram of the mobile communication terminal equipment provided with the separating device of the preferred embodiments.

FIGS. 10A and 10B show the relationship between an applied voltage and attenuation pole frequency.

FIG. 10C shows an example of the control table.

FIG. 11 is a flowchart (No.1) showing the process for setting the frequency of separating device in a mobile communication terminal when a call is established.

FIG. 12 is a flowchart (No.2) showing the process for setting the frequency of the separating device in a mobile communication terminal when a call is established.

DETAILED DESCRIPTION OF THE INVENTION

Figure 2A:
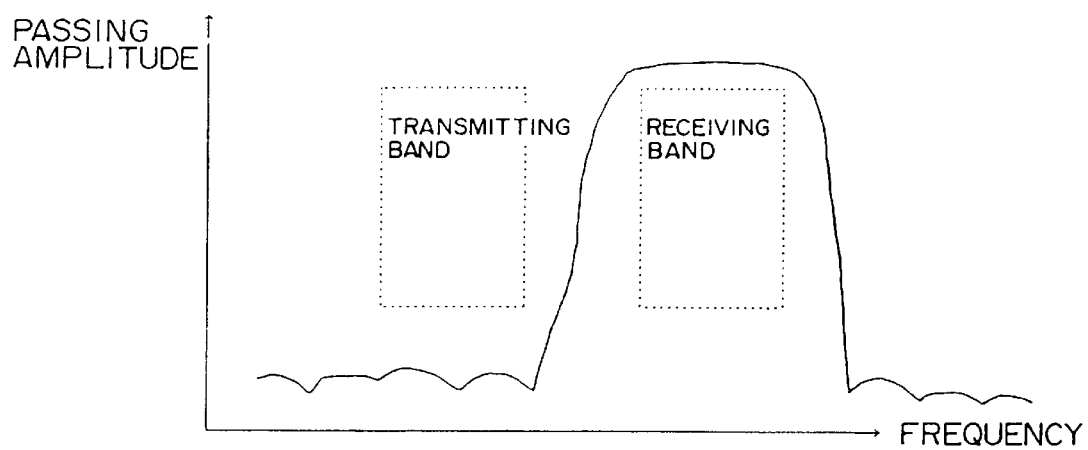
FIG. 2A shows the characteristics of a receiving filter provided in the conventional separating device.
Figure 2B:
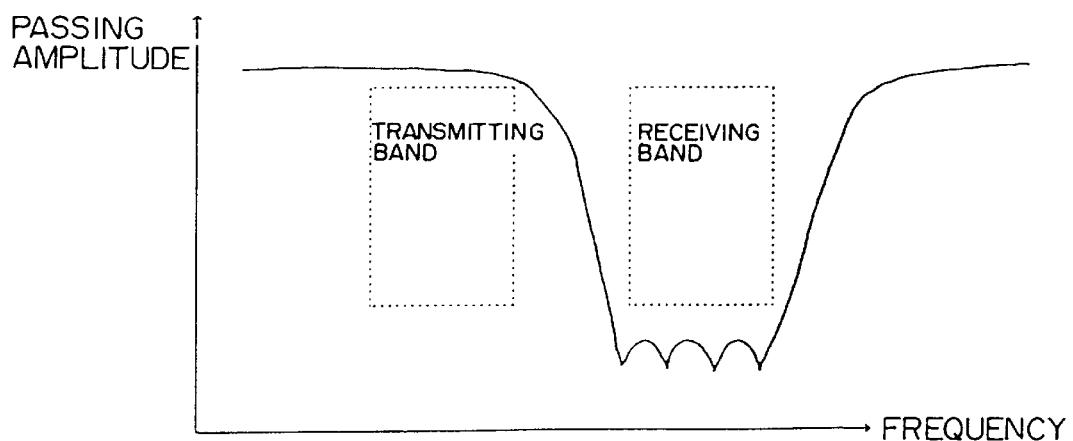
FIG. 2B shows the characteristics of a transmitting filter provided in the conventional separating device.
Figure 3:
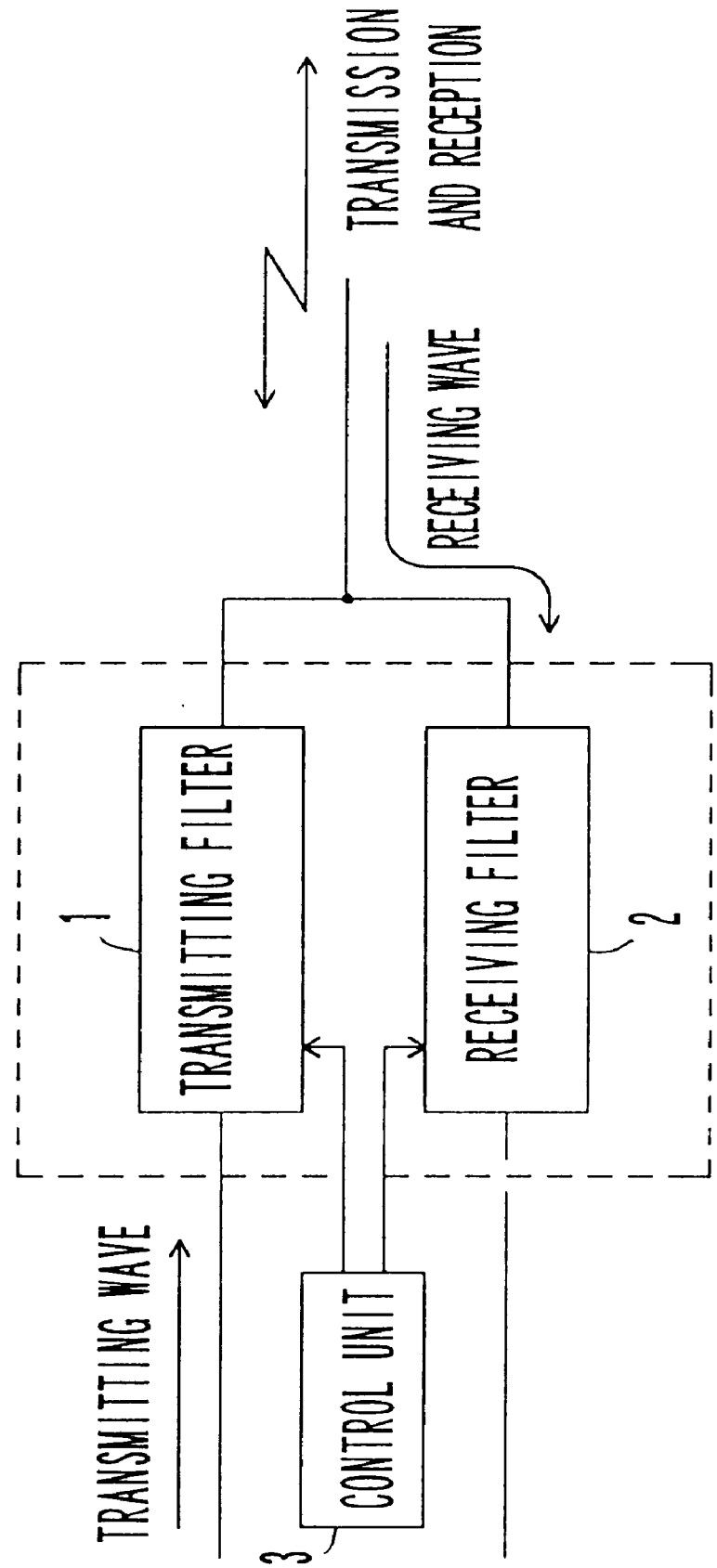
FIG. 3 is a principle diagram of this invention.

The basic concept of this invention is explained below referring to FIG. 3.

The separating device (wave separating method) of the present invention separates transmitting waves and receiving waves in communication equipment for transmitting and receiving radio signals. The separating device comprises a transmitting filter 1 for passing a transmitting wave, and a receiving filter 2 for passing a receiving wave. Each of the transmitting filter 1 and the receiving filter 2 is a band elimination filter, and can change the center frequency of each elimination band. Furthermore, it comprises a control unit 3 for controlling the frequency characteristics of the transmitting filter 1 and the receiving filter 2. The control unit 3 matches a center frequency of the elimination band of the transmitting filter 1 with the frequency of an actual receiving wave, and matches a center frequency of the elimination band of the receiving filter 2 with the frequency of an actual transmitting wave.

For the transmitting filter 1 and the receiving filter 2, a filter with a large attenuation shall be used. However, generally speaking, in a band elimination filter, obtaining a large attenuation conflicts with obtaining a broad elimination band. In the separating device of this embodiment, it is designed that each of center frequencies of the elimination bands of the transmitting filter 1 and receiving filter 2 can be shifted to a frequency at which signals should be attenuated. Here, frequency elements of a receiving wave should be eliminated from a transmitting wave by the transmitting filter 1 and frequency elements of a transmitting wave should be eliminated by the receiving filter 2. For this reason, signals can be attenuated over a substantially broad band, using a filter which provides a narrow elimination band. This can be realized using a small filter, if it is a filter with a narrow elimination band.

Next, the concrete description of the preferred embodiments of this invention is explained below referring to FIGS. 4 to 13, taking an example when the separating device of the preferred embodiments is provided in a mobile communication terminal. In this case, it is assumed that the frequency band for transmitting (transmitting band) and that for receiving (receiving band) in a mobile communication system are different from each other. It is also assumed that the mobile communication system can provide a great many (several hundred to several thousand) communication channels within a communication band (each of the transmitting band and receiving band), and an unused channel (idle channel) can be allocated from those many communication channels to a connection.

Although as a specific example, a mobile communication system is referred to and explained, this invention can be applied to a radio communication system in which the frequencies for transmitting and receiving are different from each other and that transmitting and receiving are performed simultaneously, and it does not matter whether or not the terminals are mobile.

Figure 4:
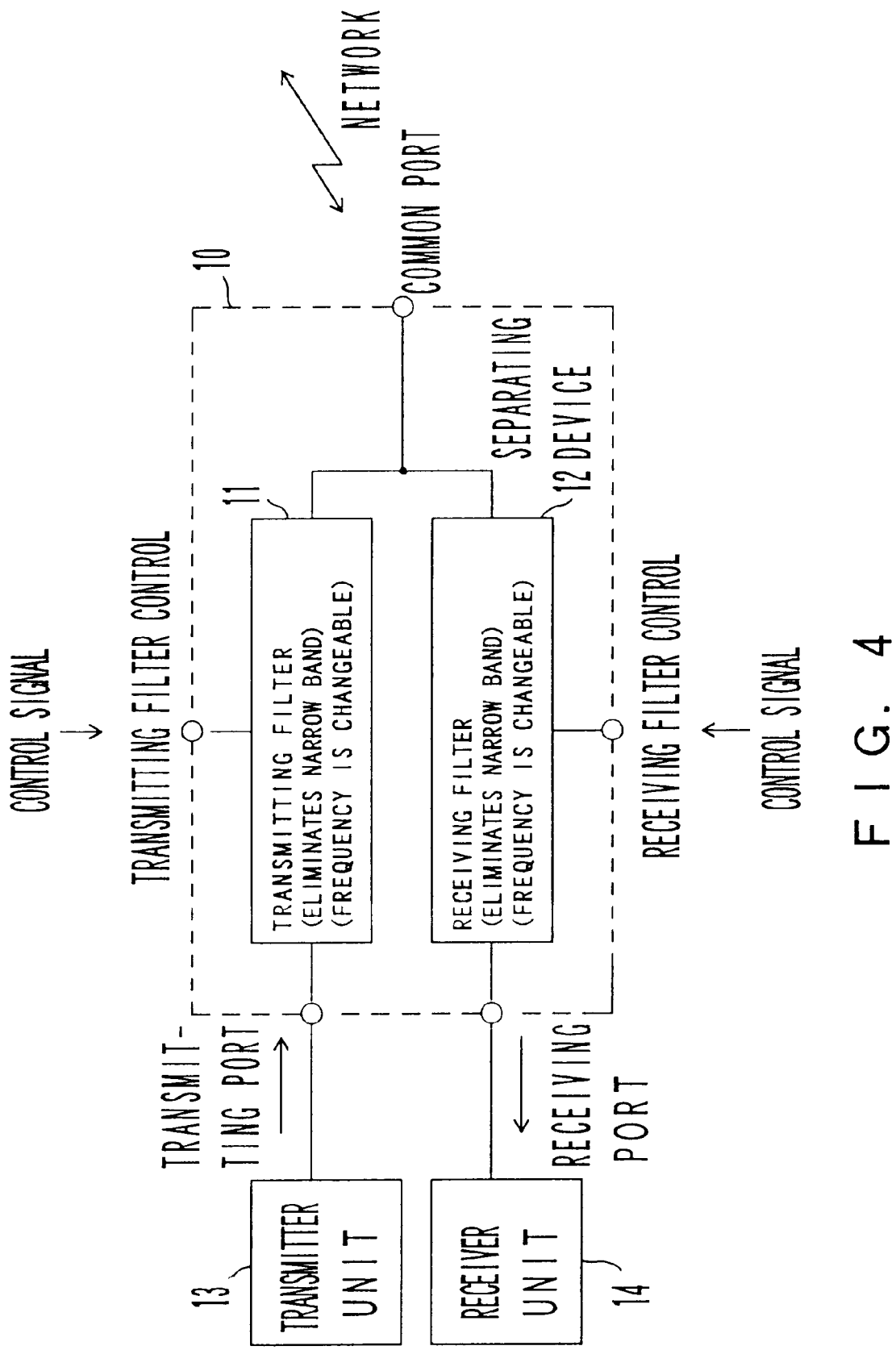
FIG. 4 shows a configuration of the separating device of the preferred embodiments.

FIG. 4 shows a configuration of the separating device of the preferred embodiments. Separating device 10 is provided with a transmitting filter 11 and a receiving filter 12. The transmitting filter 11 and the receiving filter 12 are band elimination filters. The center frequencies of the elimination bands of the transmitting filter 11 and the receiving filter 12 vary according to the control signal input from each transmitting and receiving filter control terminal. The control signals are created by a control circuit, which is not shown in FIG. 4. The elimination band width of the transmitting filter 11 and the receiving filter 12 are narrower than the transmitting band width and receiving band width respectively.

Figure 5B:
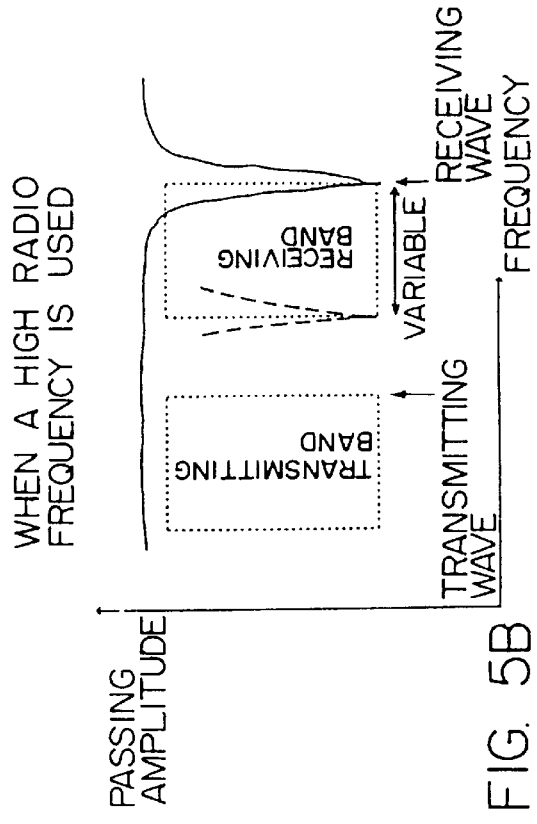
FIGS. 5A and 5B explain the characteristics and operation of the transmitting filter.
Figure 5D:
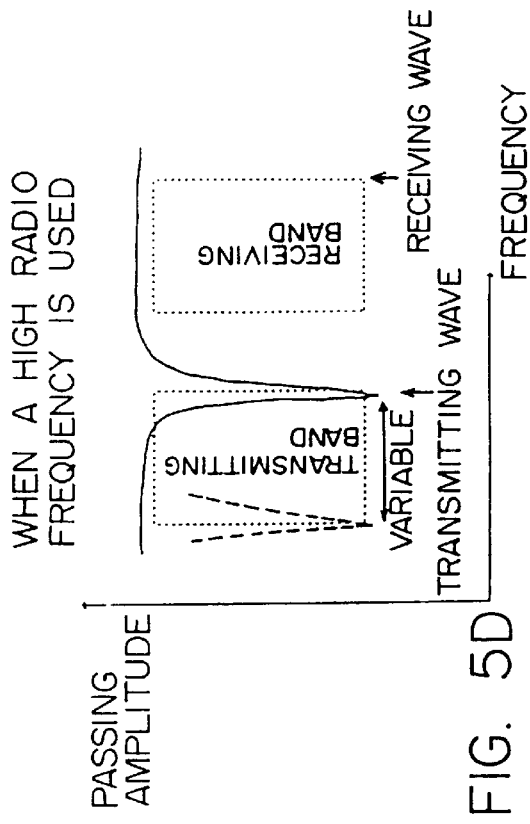
FIGS. 5C and 5D explain the characteristics and operation of the receiving filter.
Figure 5A:
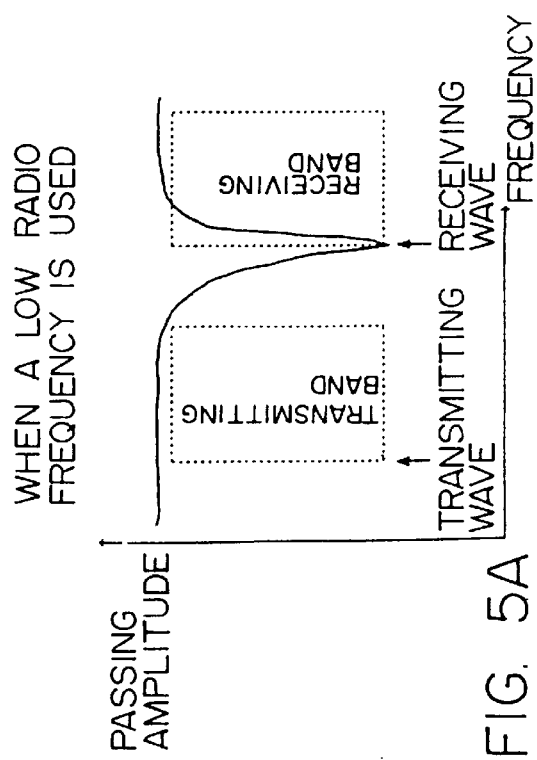

FIGS. 5A and 5B explain the characteristics and operation of the transmitting filter. It is sufficient only if the elimination band width of the transmitting filter 11 is broader than the band allocated to at least one channel. It is not necessary for it to cover the entire receiving band. The band allocated to each communication channel is, for example, several tens of KHz. In this way, a large volume of attenuation can be easily obtained, because the elimination band of the transmitting filter 11 is much narrower compared with the entire receiving band.

The center frequency of the elimination band of the transmitting filter 11 is controlled so as to coincide with the frequency of a receiving wave from a network. Namely, it is controlled so that the center frequency of the elimination band of the transmitting filter 11 coincides with the frequency allocated to the communication channel established for receiving signals. For example, the characteristics of the transmitting filter 11, when a signal is received from a network through a channel to which the lowest frequency in a communication band is allocated, are shown in FIG. 5A. And those when signal is received from the network through a channel to which the highest frequency in the communication band is allocated are shown in FIG. 5B. Because the transmitting filter 11 passes the frequency elements of the transmitting band, a signal (transmission signal) actually transmitted to a network is not attenuated.

In this way, a frequency element which is the same as that of a receiving wave from a network is eliminated from the transmitting wave which carries a transmitting signal generated by the transmitter unit 13. Namely, the energy of the frequency element of a receiving wave in the transmitting wave is sufficiently attenuated after being through the transmitting filter 11. Thus, the receiving wave from the network, which is very weak, can be input into receiver unit 14 without being effected by the transmitting wave. Neither does it occur that the frequency element which is same as that of a receiving wave contained in the transmitting wave, which has far stronger radio power compared with that of a receiving wave, may saturate receiver unit 14.

Figure 5C:
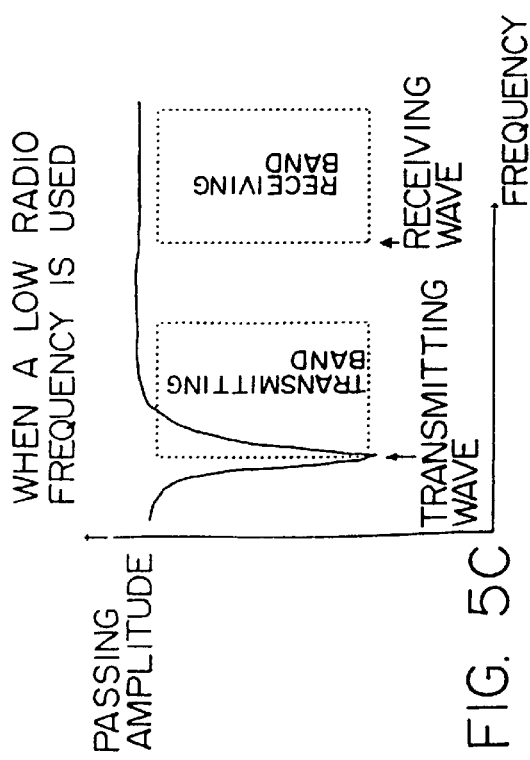

FIGS. 5C and 5D explain the characteristics and operation of receiving filter 12. It is sufficient only if the elimination band width of receiving filter 12 is broader than the band allocated to at least one channel like the transmitting filter 11. It is not necessary for it to cover that entire transmitting band.

The center frequency of the elimination band of receiving filter 12 is controlled so as to coincide with the frequency of a transmitting wave which carries transmitting signals to the network. Namely, it is controlled so that the center frequency of the elimination band of receiving filter 12 coincides with the frequency allocated to the communication channel established for the transmitting signal. For example, the characteristics of receiving filter 12 when the signal is transmitted to the network through a channel to which the lowest frequency in a communication band is allocated are shown in FIG. 5C. And those when the signal is transmitted to the network through a channel to which the highest frequency is allocated are shown in FIG. 5D. Since the elimination band of receiving filter 12 is much narrow compared with the entire transmitting band, a large amount of attenuation can be easily obtained.

In this way, a part of the transmitting wave is input into the receiver side via the common port after the frequency element which is the same as that of a transmitting wave carrying a transmitting signal is eliminated from the transmitting wave by the receiving filter 12. Here, generally speaking, the signal amplitude at the frequency for transmitting a signal (frequency over which a transmission signal is sent out to a network) is larger than that at the frequency for not transmitting a signal. For this reason, frequency elements having a large amplitude contained in the transmitting wave are prevented from being input into receiver unit 14 to create bad effects such as causing an unstable operation and generating noise, by providing the receiving filter 12 to eliminate the frequency element which is same as that of the transmitting wave carrying the transmitting signal.

Because the communication band of a mobile communication system is several hundred MHz to several GHz, transmitting filter 11 and receiving filter 12 are required to operate at a high speed. In addition, the transmission filter 11 and the receiving filter 12 should be light and compact, and should provide a large amount of attenuation. From this point of view, filters using a dielectric resonant element are employed for transmitting filter 11 and receiving filter 12. A filter using a dielectric resonant element attenuates a particular frequency element very well since it operates in a coaxial resonant mode. Filters of the present invention are not limited to a dielectric resonant element type, and other types of filters can be used, if they meet the desired specifications (frequency of elimination band, attenuation, size and weight.) For example, besides circuit filters using LCRs, active filters and digital filters can be used.

Figure 6A:
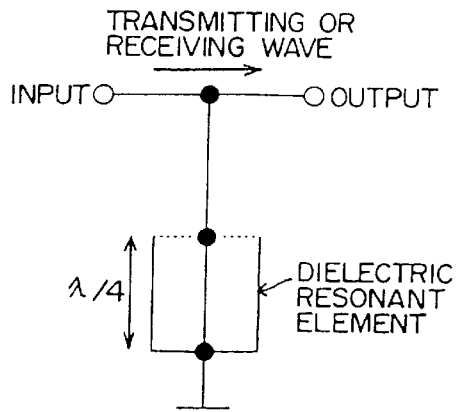
FIG. 6A shows a configuration of a filter employing a dielectric resonant element.
Figure 6B:
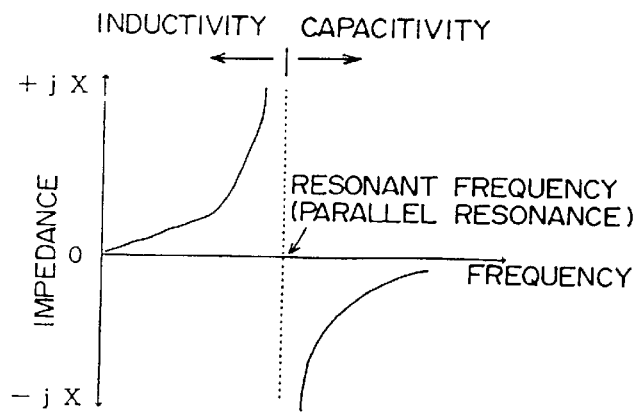
FIG. 6B shows the characteristics of the filter shown in FIG. 6A.

FIGS. 6A to 6E explain the composition and attenuation characteristics of a filter using a dielectric resonant element. FIG. 6B shows the frequency characteristics of an impedance when a dielectric resonant element is provided, as shown in FIG. 6A, on a transmission path of a transmitting wave or a receiving wave. In FIG. 6B, the frequency which the impedance is diverging is a resonant frequency due to a parallel resonance. This resonant frequency corresponds to the length ($\lambda 4$) of the dielectric resonant element. These frequency characteristics indicate induction (characteristics due to its inductance element) in a range of frequency lower than the resonant frequency and capacitance (characteristics due to its capacity element) in a range of frequency higher than the resonant frequency.

Figure 6C:
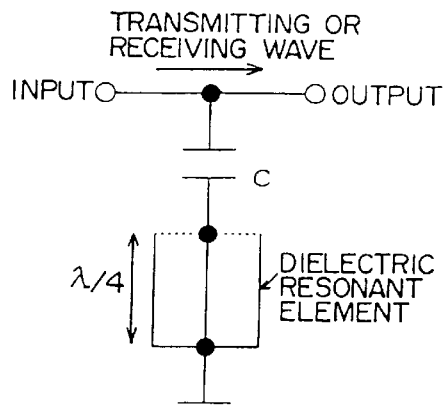
FIG. 6C shows a configuration of a filter employing a dielectric resonant element.
Figure 6D:
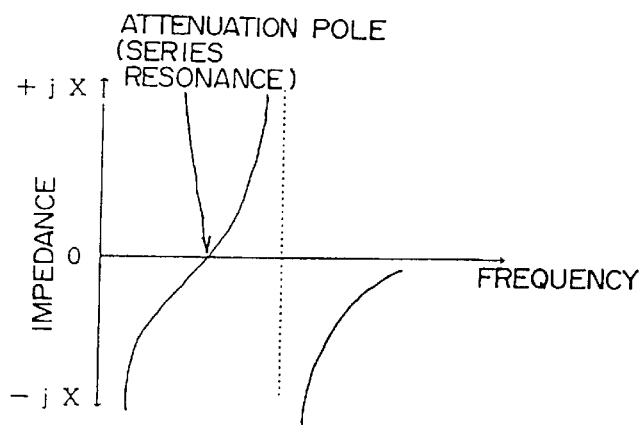
FIGS. 6D and 6E show the characteristics of the filter shown in FIG. 6C.
Figure 6E:
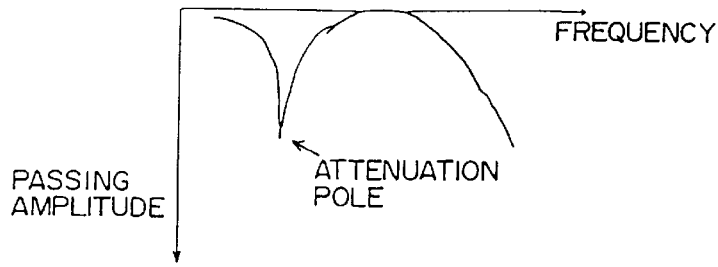

When a capacitor C is provided in series in the dielectric resonant element as shown in FIG. 6C, a series resonant circuit is configured by the inductance element of the dielectric resonant element and the capacity element of the inserted capacitor C. The frequency characteristics of an impedance having such a composition as shown in FIG. 6C, are shown in FIG. 6D. At a frequency at which a series resonance occurs, the circuit consisting of a dielectric resonant element and a capacitor C is short-circuited, and its impedance becomes 0. For this reason, the frequency characteristics of the amplitude of a passing frequency (transmitting or receiving waves) in such a composition as shown in FIG. 6C, become as shown in FIG. 6E. Namely, a sharp attenuation pole is generated in the frequency in which a series resonance occurs. A frequency of the attenuation pole is a center frequency of the elimination band.

In such a composition as shown in FIG. 6C, the frequency of the attenuation pole (resonant frequency) can be set to a desired value by changing the capacity element or inductance element of the series resonant circuit. Although the inductance element of the dielectric resonant element can be changed logically, it is not practical. Thus, in this embodiment a variable capacitor is used for the capacitor C, and the frequency of the attenuation pole is changed by changing the capacity of the capacitor C.

Figure 7:
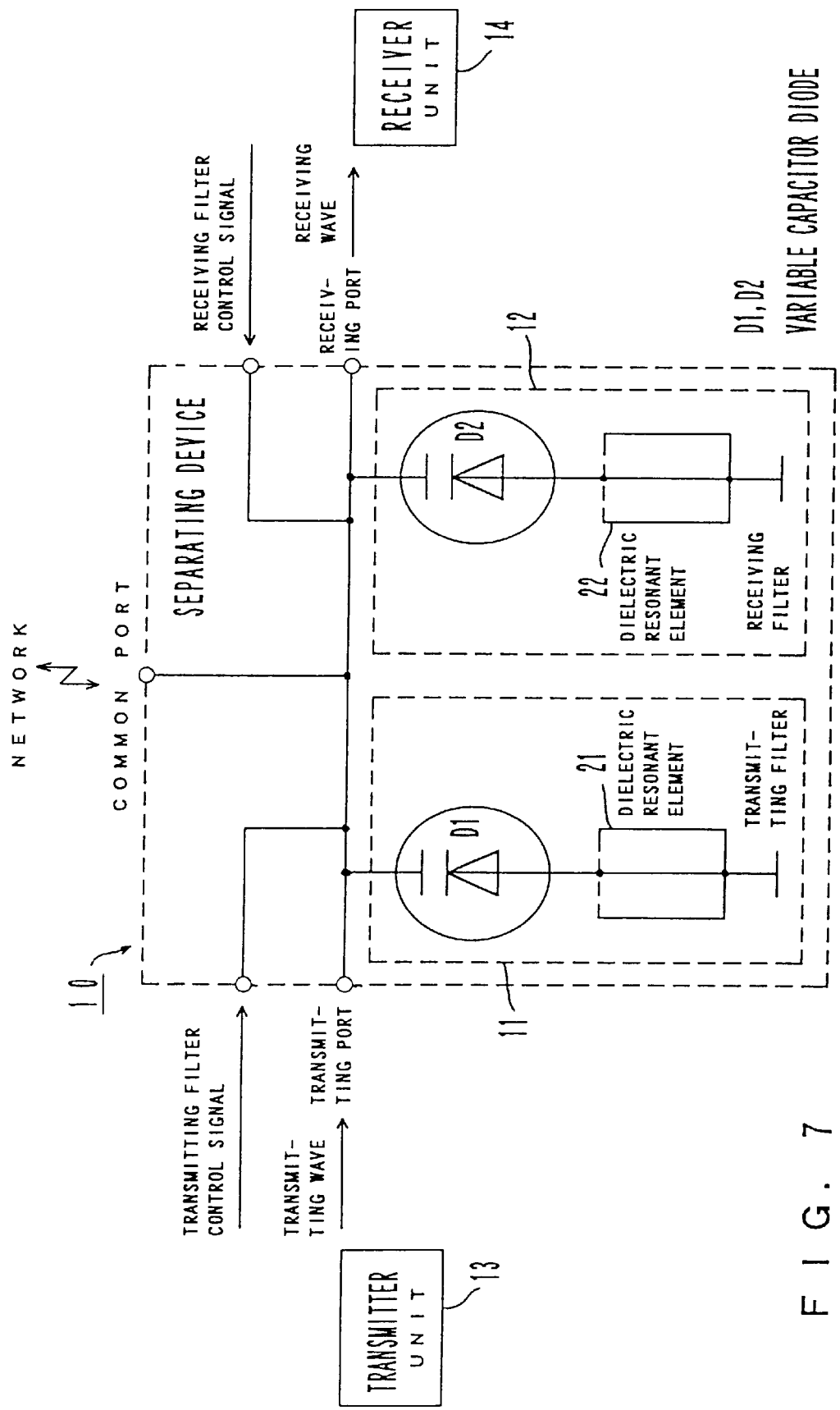
FIG. 7 is a circuit diagram of the separating device of the preferred embodiments.

FIG. 7 is a circuit diagram of the separating device of the preferred embodiments. In transmitting filter 11, a dielectric resonant element 21 and a variable capacity diode D1 are connected in series. The dielectric resonant element 21 and the variable capacity diode D1 correspond to the dielectric resonant element and capacitor C shown in FIG. 6C, respectively. The basic composition of receiving filter 12 is the same as that of transmitting filter 11, in which a dielectric resonant element 22 and a variable capacity diode D2 are connected in series. Therefore, dielectric resonant element 22 and variable diode D2 correspond to the dielectric resonant element and capacitor C shown in FIG. 6C, respectively.

Variable capacity diodes D1 and D2 are pn junction diodes (diodes which are formed by joining a p type semiconductor area and an n type semiconductor area), and when a reverse bias voltage to be applied changes, the thickness of the depletion region formed in the pn joint changes and then its capacity changes. Namely, the depletion region of variable capacity diodes D1 and D2 can be adjusted by controlling a voltage to be applied. In filters such as transmitting filter 11 and receiving filter 12 in which a resonant element and capacitor are connected in series, the frequency of the attenuation pole changes as mentioned above when the capacity of the capacitor is changed. In addition, as mentioned above, the frequency of the attenuation pole is the center frequency of the elimination band. Therefore, the elimination band (attenuation pole) frequencies of transmitting filter 11 and receiving filter 12 can be adjusted by controlling the applied voltages of variable capacity diodes D1 and D2. In FIG. 7, the applied voltages of variable capacity diodes D1 and D2 are shown as transmitting and receiving filter control signals, respectively. The transmitting and receiving filter control signals, for example, are supplied using on RFC (Radio Frequency Choke).

FIG. 8 is a block diagram of a mobile communication terminal with the separating device of the preferred embodiments. Here, a cellular phone shall be used as an example of the mobile communication terminal. FIG. 8 shows the portion especially related to the operation of the separating device of the preferred embodiments.

The audio signal input from a microphone 41 is modulated by a modulator 42. The modulated audio signal is transmitted through a communication channel on a network. The band allocated to each communication channel, for example, is 10 to several tens of KHz. This modulated audio signal passes through an IF filter 43 after being converted to a transmitting signal with the IF band frequency corresponding to the transmitting frequency of the currently used communication channel. The IF (Intermediate Frequency), for example, is several tens to 100 MHz. The transmitting signal which has passed through IF filter 43 is put on a radio frequency band carrier wave (transmitting wave) generated by an oscillator 44. The radio frequency band, for example, is several hundreds M of MHz to 2 GHz.

The transmitting wave carrying the transmitting signal is input to the separating device 10 after being amplified by a power amplifier 45. The separating device 10 sends the transmitting wave out to the network after eliminating the frequency element of a communication channel which is currently used for receiving signals from the transmitting wave.

On the other hand, the waves received from the network are input to the separating device 10. The separating device 10 eliminates the frequency element of a communication channel which is currently used for transmitting signals from the receiving wave. The output of the separating device 10 is converted to an IF band signal using a radio frequency carrier wave generated by oscillator 44 after being amplified by a low noise amplifier 46. IF filter 47, for example, is a crystal MCF and eliminates noise from the IF signals. Frequency elements of the currently used channel are extracted from the signals which have passed through the IF filter 47. A demodulator 48 demodulates the extracted signal, and a speaker 49 outputs it.

In this configuration the separating device 10 corresponds to those shown in FIG. 4 and FIG. 7. Control circuit 30 generates transmitting and receiving filter control signals, explained in FIG. 7, and adjusts the center frequency of the elimination band (attenuation pole) of transmitting filter 11 and receiving filter 12 to match the receiving and transmitting frequencies which the corresponding mobile communication terminal is currently using, using the control signals.

Figure 9:
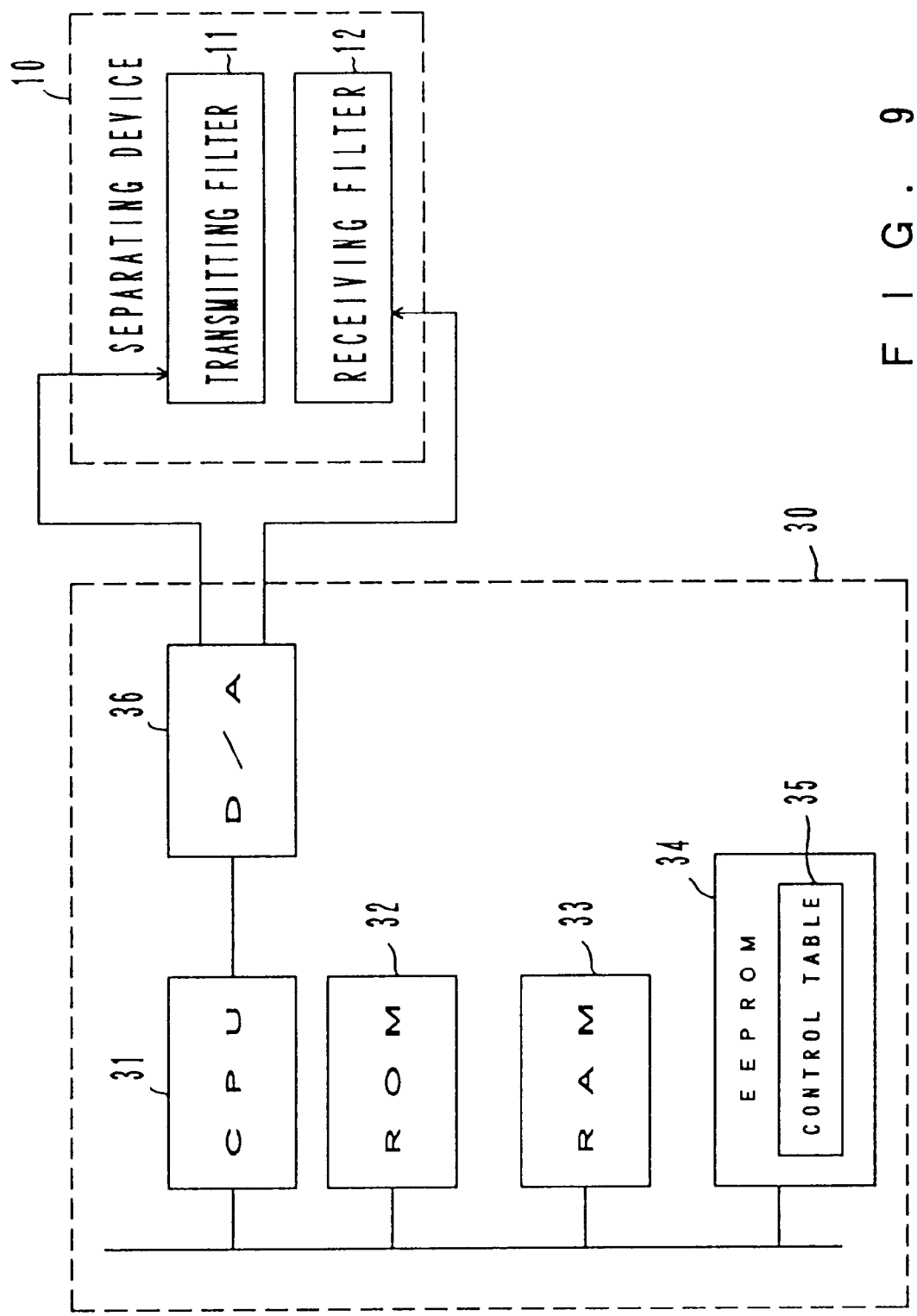
FIG. 9 is a block diagram of the control circuit.

FIG. 9 is a block diagram of control circuit 30. CPU 31 executes programs stored in ROM 32 or RAM 33, generates values corresponding to the receiving and transmitting frequencies of the currently used communication channel, and outputs them. EEPROM 34 stores a control table 35. In the control table 35 is stored information on the relationship between the communication channels which are provided by the common carrier and the voltage values corresponding to the communication channels.

CPU 31 recognizes the currently used communication channel, takes out the voltage value corresponding to the communication channel referring to control table 35, and outputs it as its voltage value data. D/A converter 36 converts the voltage value data output by CPU 31 to analog values, and applies them to transmitting filter 11 and receiving filter 12.

The mobile communication terminal equipped with the separating device of the preferred embodiments, is provided with a unit (including a CPU and memory) for controlling the establishment and disconnection of a call, and the function of the control circuit 30 shown in FIG. 9 can also be realized using this unit.

The operation of the control circuit 30 will be explained below referring to FIG. 9 and FIGS. 10A to 10C. FIGS. 10A and 10B show the relationship between a voltage applied to the variable capacity diodes D1 or D2, shown in FIG. 7, and the attenuation pole frequencies of transmitting filter 11 or the receiving filter 12. When the voltage applied to the variable capacity diodes D1 or D2 is large as described above, the depletion region width of the pn junction becomes large, as a result, the resonant frequency of the resonant circuit comprising variable capacity diode D1 or D2 and a dielectric resonant element (Dielectric resonant elements 21 or 22) becomes large. Namely, the attenuation pole frequencies of transmitting filter 11 and receiving filter 12 can be controlled by voltages applied to variable capacity diodes D1 and D2, respectively. Here, if the attenuation pole frequency varies linearly according to the applied voltage as shown in FIG. 10B, a desired attenuation pole frequency can be easily obtained by controlling the applied voltage. Therefore, if there is a range where the attenuation pole frequency varies linearly according to the applied voltage, the range shall be used in the frequency control of transmitting filter 11 and receiving filter 12. The relationship between the applied voltage and the attenuation pole frequency shown in FIG. 10B, shall be obtained beforehand by experiment or simulation, and be stored in the control circuit 30 as the control table 35.

FIG. 10C is an example of the control table 35. The control table 35 stores frequency data indicating frequencies allocated to each channel and apply voltage values for matching the attenuation pole frequencies of transmitting filter 11 and receiving filter 12 with frequencies allocated to each channel corresponding to each channel provided by the common carrier.

In the communication system of the preferred embodiments, it is presumed that transmitting and receiving frequencies are different, and one set of transmitting and receiving frequencies are allocated to one communication channel. Therefore, the control table 35 stores transmitting and receiving frequencies for each channel, and the applied voltages corresponding to each frequency.

CPU 31 recognizes the currently used communication channel. Here, for example, it is assumed that communication is carried out using 1,000 ch. Namely, signals transmitted from this mobile communication terminal to the network are carried on a transmitting wave of 820 MHz, and signals from the network to this mobile communication terminal are carried on a receiving wave of 870 MHz. In this case, CPU 31 takes out "1,000V" as an applied voltage for the receiving filter 12 in order to match the attenuation pole frequency of the receiving filter 12 with the frequency of the transmitting wave and "2,250V" as an applied voltage for the transmitting filter 11 in order to match the attenuation pole frequency of the transmitting filter 11 with the frequency of the receiving wave, referring to the control table 35, and outputs them as voltage value data.

D/A converter 36 converts these voltage value data received from CPU 31 to analog values and applies them to the transmitting filter 11 and the receiving filter 12. Thus, an applied voltage for the transmitting filter is applied to the transmitting filter 11, and its attenuation pole frequency is matched with the frequency of the receiving wave. On the other hand, an applied voltage for the receiving filter is applied to the receiving filter 12, and its attenuation pole frequency is matched with the frequency of the transmitting wave. Namely, the transmitting filter 11 eliminates the frequency element of the receiving wave from waves passing through it, while the receiving filter 12 eliminates the frequency element of the transmitting wave from waves passing through it.

Next, the operation of the separating device of this preferred embodiment provided in the mobile communication terminal, when a call is established, is explained. The process when the mobile communication terminal terminates a call is explained below referring to FIGS. 11 and 12. In the following explanation, the mobile communication terminal (mobile terminal) is functionally divided into a control unit and a radio unit.

When a mobile unit is turned on, the mobile terminal refers to the predetermined initial channel. Namely, because generally speaking when a request for a call connection is broadcasted from the base station through a specified channel (control channel) out of several channels, the mobile terminal adjusts its own frequency synthesizer so that signals carried on the control channel can be received.

Then, the control unit sets the frequency of the separating device. Namely, the control unit refers to control table 35 shown in FIG. 10C, and outputs an applied voltage corresponding to the control channel. For example, assuming that the control channel is 1 ch, "0.500V" and "1.750V" are output as an applied voltage for receiving and transmitting filters, respectively. Thus, transmitting filter 11 and receiving filter 12 operate so as to eliminate the receiving and transmitting frequencies allocated to the control channel.

The radio unit detects the RSSI (Received Signal Strength Indication) of received signal when the frequency of the separating device is set for the control channel, and the control unit considers that this mobile terminal is receiving signals from the base station, when this RSSI is larger than the predetermined value, and then decodes received data. And when valid data is detected, the mobile terminal enters a waiting state and waits for signals from the base station. On the other hand, when the RSSI is less than the predetermined value and there are other control channels, the control unit obtains the next candidate for the control channel and repeats the processes mentioned above. The RSSI is a voltage value proportional to a signal strength (dB logarithm) obtained by measuring (detecting) the received signal.

In FIG. 12, when the base station detects a call (a call request) to the mobile terminal from another terminal or another base station, it sends an answer request to the mobile terminal via the control channel. When the mobile terminal receives this request, it decodes its contents and sends back an answer signal to the base station, if the destination of the request is the mobile terminal.

When the base station detects the answer signal from the mobile terminal, it instructs the mobile terminal to change a channel from the control channel into a communication channel. Namely, the base station hunts for one idle communication channel and notifies the mobile terminal of the communication channel. When the mobile terminal recognizes the communication channel notified by the base station, it adjusts its own frequency synthesizer so that signals of the communication channel can be transmitted and received.

Then, the mobile terminal sets the frequency of the separating device again. Namely, the control unit refers to control table 35 shown in FIG. 10C, and outputs applied voltages corresponding to the communication channel notified by the base station. For example, assuming that the communication channel is 1,000 ch, "1.000V" and "2.250V" are output as applied voltages for receiving and transmitting filters. Thus, transmitting filter 11 and receiving filter 12 operate so as to eliminate the receiving and transmitting frequencies allocated to the communication channel, respectively.

Then, when a transmission instructing signal is sent out to the base station from the mobile terminal and the signal is recognized by the base station, a connection is established and communication starts. The voltages applied to transmitting filter 11 and receiving filter 12 are held as they are until the connection is disconnected.

In FIG. 11 and FIG. 12, the operation when a mobile communication terminal terminates a call is shown. The frequency setting operation of the separating device when the mobile communication terminal originates a call is basically the same as that when it terminates a call.

As described above, a band elimination filter with a narrow elimination band and a sharp attenuation pole is used for the transmitting and receiving filters in this preferred embodiments. Accordingly, each filter does not cover the whole communication band statistically. However, a band width allocated to each channel for transmitting and receiving signals is far narrower than a width of the whole communication band, and the mobile communication terminal recognizes frequencies for transmitting and receiving signals.

According to the separating device of the embodiment, a band elimination filter with a narrow elimination band, a center frequency of the elimination band is controllable externally, is provided and the center frequency of the elimination band is dynamically controlled to coincide with a target frequency in the communication band. Thus, the whole communication band can be covered by a band elimination filter with a narrow elimination band.

Generally speaking, a band elimination filter with a narrow elimination band can be realized by single resonant filter (without connecting several filters with different frequency characteristics in several stages). Therefore, each of the transmitting and receiving filters, which compose a separating device to separate the transmitting wave from the receiving wave in entire communication band, can be realized by one stage of a filter circuit, respectively.

Although in the above described of the preferred embodiments a band elimination filter is used for both transmitting and receiving filters composing the separating device, this invention shall not be limited to this composition. For example, a band pass type filter shown in FIG. 13A can also be used as a transmission filter or a receiving filter. Namely, for the transmitting filter is used a band pass filter which passes the frequency of a transmitting wave only, and for the receiving filter a band pass filter which passes the frequency of a receiving wave only, respectively. In this case the components of each filter shall be decided so that the attenuation volume at center frequency of the pass band (in the case of resonant type, resonant frequency) of each filter may become a minimum.

Figure 13A:
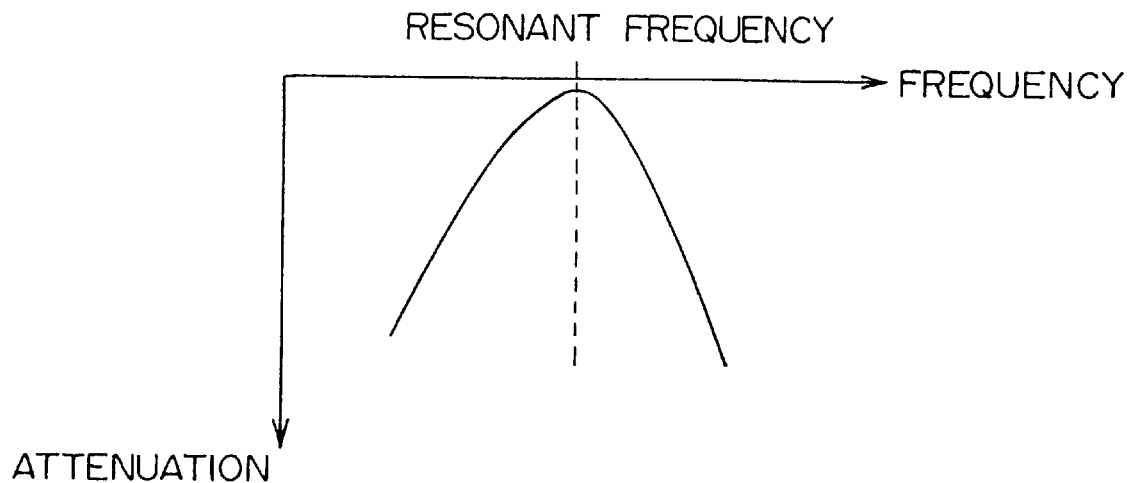
FIG. 13A shows the characteristics of a band pass filter.
Figure 13B:
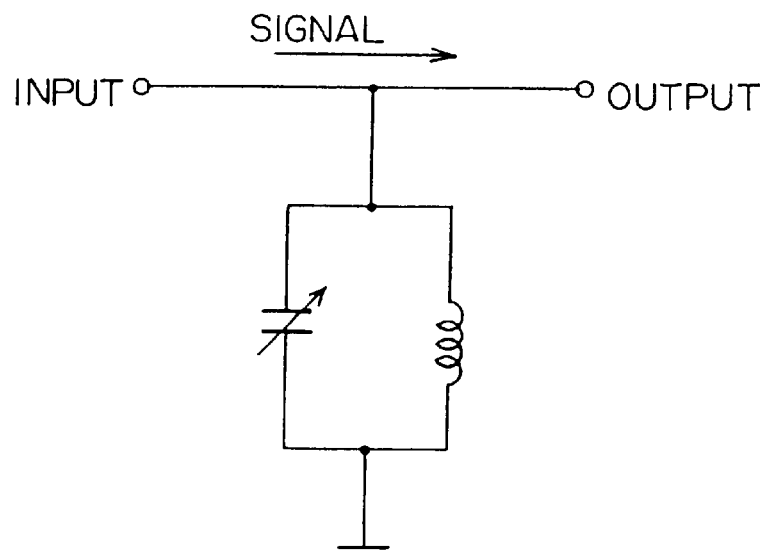
FIG. 13B shows an example of the configuration of a band pass filter.

The band pass filter, for example, can be realized by a resonant circuit in which an inductance and capacity are connected in parallel, as shown in FIG. 13B. In this case, for example, the inductance can be realized by a dielectric resonant element and the capacity can be composed of a variable capacity diode respectively, and the resonant frequencies of each filter can be matched with the frequencies of the transmitting or receiving waves by changing the capacity.

Although in the above mentioned example the frequencies of transmitting and receiving waves are different, this invention shall not be limited to this use. The separating device of the present invention can be used in a system in which the frequencies of the transmitting and receiving waves are the same. Furthermore, this separating device can also be used in a system in which its transmitting and receiving timings overlap each other or in a system in which they are time-divided so that they may not overlap.

As mentioned above, the separating device of this invention is configured so that frequency filters with a narrow band are provided as a transmitting filter and a receiving filter, and center frequencies of a elimination or pass band of the frequency filters are adjusted to match with the frequencies of a currently used communication channel. For this reason, it has become possible to separate the transmitting and receiving waves across the whole communication band using a light and compact filter. It is believed that the light and compact separating device will contribute to the realization of a light and compact mobile communication terminal which is strongly desired by its users.

What is claimed is:

1. A separating device for separating a transmitting wave and a receiving wave in a communication equipment for transmitting and receiving signals, comprising:
   a transmitting filter, a center frequency of an elimination band of said transmitting filter being adjusted based on the frequency of the receiving wave; and
   a receiving filter, a center frequency of an elimination band of said receiving filter being adjusted based on the frequency of the transmitting wave.

2. The separating device according to claim 1, wherein each width of the elimination band of said transmitting filter and said receiving filter is narrower than the width of a receiving band and a transmitting band, respectively.

3. The separating device according to claim 1, wherein each of said transmitting filter and said receiving filter includes a resonant circuit in which a device with a capacity element and a device with an inductance element are connected in series, and the center frequencies of each elimination band is adjusted by controlling the resonant frequency of the resonant circuit.

4. The separating device according to claim 3, wherein said device with a capacity element is a diode, and the resonant frequency is adjusted by controlling a voltage applied to the diode.

5. A separating device for separating a transmitting wave and a receiving wave in a communication equipment for transmitting and receiving signals, comprising:
   a transmitting filter, a frequency of an attenuation pole of said transmitting filter being adjusted based on the frequency of said receiving wave; and
   a receiving filter, a frequency of an attenuation pole of said receiving filter being adjusted based on the frequency of said transmitting wave.

6. A separating apparatus for separating a transmitting wave and a receiving wave in a communication equipment for transmitting and receiving signals, comprising:
   a transmitting filter, a center frequency of an elimination band of said transmitting filter being adjustable externally;
   a receiving filter, a center frequency of an elimination band of said receiving filter being adjustable externally; and
   control means for controlling the center frequency of the elimination band of said transmitting filter based on the frequency of the receiving wave and controlling the center frequency of the elimination band of said receiving filter based on the frequency of the transmitting wave.

7. The separating apparatus according to claim 6, wherein said control means matches the center frequency of the elimination band of said transmitting filter with the frequency of the receiving wave and matches the center frequency of the elimination band of said receiving filter with the frequency of the transmitting wave.

8. The separating apparatus according to claim 6, wherein each width of the elimination band of said transmitting filter and said receiving filter is narrower than the width of a receiving band and a transmitting band, respectively.

9. The separating apparatus according to claim 6, wherein each of said transmitting filter and said receiving filter includes a resonant circuit in which a device with a capacity element and a device with an inductance element are connected in series, and wherein said control means adjusts the center frequencies of each elimination band by controlling the resonant frequency of the resonant circuit.

10. The separating apparatus according to claim 9, wherein said device with a capacity element is a diode, and wherein said control means adjusts the resonant frequency by controlling a voltage applied to the diode.

11. A separating apparatus for separating a transmitting wave and a receiving wave in a communication equipment for transmitting and receiving signals, comprising:

a transmitting filter, a center frequency of a pass band of said transmitting filter being adjustable externally;

a receiving filter, a center frequency of a pass band of said receiving filter being adjustable externally; and control means for matching the center frequency of the pass band of said transmitting filter with the frequency of the transmitting wave and matching the center frequency of the pass band of said receiving filter with the frequency of the receiving wave.

12. A radio communication apparatus for transmitting and receiving radio signals through one of several channels provided within a predetermined radio band, comprising:

a separating device, which includes a transmitting filter and a receiving filter, each of center frequencies of elimination bands of the transmitting filter and the receiving filter being adjustable externally, for separating a transmitting wave and a receiving wave;

detecting means for detecting a communication channel used to transmit and receive radio signals; and control means for matching the center frequency of the elimination band of said transmitting filter with the receiving frequency of the communication channel detected by said detecting means and matching the center frequency of the elimination band of said receiving filter with the transmitting frequency of the communication channel detected by said detecting means.

* * * * *